United States Patent [19]

Shen et al.

[11] Patent Number: 4,761,447

[45] Date of Patent: Aug. 2, 1988

[54] HEAT-VULCANIZABLE MOLDABLE/EXTRUDABLE ORGANOPOLYSILOXANE COMPOSITIONS

[75] Inventors: Ming Shen, Lakewood, N.J.; Robert Lagarde, Feyzin, France

[73] Assignee: Rhone-Poulenc Chimie, Courbevoie, France

[21] Appl. No.: 19,949

[22] Filed: Feb. 27, 1987

[30] Foreign Application Priority Data

Feb. 27, 1986 [FR] France ................ 86 02962

[51] Int. Cl.$^4$ ............................................. C08L 33/00
[52] U.S. Cl. ........................... 524/251; 524/267; 524/268; 524/425; 524/431; 524/433; 524/437; 524/445; 524/448; 524/428; 524/860; 524/796; 528/21; 528/24
[58] Field of Search ............... 528/21, 24; 524/860, 524/251, 267, 268, 425, 431, 433, 437, 445, 448, 428, 796

[56] References Cited

U.S. PATENT DOCUMENTS

| | | | |
|---|---|---|---|
| 2,707,179 | 4/1955 | Peyrot et al. | 260/46.5 |
| 2,803,619 | 8/1957 | Dickman | 525/477 |
| 2,819,236 | 1/1958 | Dickman | 528/24 |
| 3,024,214 | 3/1962 | Fenner | 260/37 |
| 3,660,345 | 5/1972 | Bobear | 528/24 |
| 4,444,940 | 4/1984 | Polmanteer | 528/24 |

FOREIGN PATENT DOCUMENTS

| | | |
|---|---|---|
| 055957 | 1/1981 | European Pat. Off. |
| 149382 | 12/1983 | European Pat. Off. |
| 1237927 | 6/1959 | France. |

OTHER PUBLICATIONS

Hack's Chemical Dictionary, 4 ed., (1972), p. 35.

*Primary Examiner*—Melvyn I. Marquis
*Attorney, Agent, or Firm*—Burns, Doane, Swecker & Mathis

[57] ABSTRACT

Heat-vulcanizable organopolysiloxane compositions well adopted for extrusion and molding, and facilely converted into elastomeric shaped articles having improved physical and electrical properties, e.g., seals and sections, include a diorganopolysiloxane oil containing from 0.05 to 3 mol % of vinylsiloxy recurring units, as well as an amine having a pKa greater than 7.5 in aqueous solution at 25° C. and a boiling point of less than 270° C. at atmospheric pressure.

9 Claims, No Drawings

HEAT-VULCANIZABLE MOLDABLE/EXTRUDABLE ORGANOPOLYSILOXANE COMPOSITIONS

BACKGROUND OF THE INVENTION

1. Field of the Invention

The present invention relates to novel organopolysiloxane compositions which set under hot conditions to form elastomers. These novel compositions are readily molded and extruded, making it possible, on the one hand, to quickly and completely fill mold cavities therewith, and, on the other hand, to provide extrudates which are homogeneous both at the face surfaces thereof, as well as internally. In addition to such advantages, the subject novel compositions form silicone elastomers which have a combination of remarkable properties, especially good resistance to boiling water and superior physical and electrical properties, whatever the amount of inorganic fillers contained therein.

2. Description of the Prior Art

From the very outset of the production of heat-vulcanized silicone rubbers, this art has been fraught with attempts to improve the physical characteristics thereof, especially their heat and reversion resistance.

The techniques employed therefor are widely described in the literature, patent and otherwise, including, among others, U.S. Pat. Nos. 2,803,619, 2,819,236, 3,024,126, 3,652,475, 3,660,345, 4,335,035 and 4,444,940, and British Patent No. 915,010.

U.S. Pat. No. 2,803,619 relates to compositions containing a diorganopolysiloxane resin which is devoid of vinyl radicals and a diorganopolysiloxane polymer containing a sufficient amount thereof to provide one vinyl radical per 5,000 to 20,000 silicon atoms present in the mixture of resin and polymer. These compositions set, with the assistance of an organic peroxide, to silicone elastomers which have a low residual compression set.

U.S. Pat. No. 2,819,236 relates to compositions containing a silicone resin, a diorganopolysiloxane oil having a viscosity of less than 1 million mPa.s at 25° C., containing from 5 to 15 mol % of organosiloxy units, each bearing a vinyl radical, and an organic peroxide.

The elastomers produced from such compositions have low hardness and high quality mechanical properties.

U.S. Pat. No. 3,024,126 describes a process for treating a reinforcing silica with the combination of an amino compound and an organosilicon compound containing hydroxy or alkoxy radicals. Silicone elastomers containing such silica have improved physical characteristics.

British Patent No. 915,010 relates to a process for the preparation of silicone elastomers by preliminary heating of compositions containing a diorganopolysiloxane polymer, a reinforcing silica, an organosilicon compound containing hydroxy or alkoxy radicals and an amino compound selected from among ammonia or a primary, secondary or tertiary amine. The silicone elastomers have a high rupture strength and a high tear resistance, as well as improved heat resistance.

U.S. Pat. No. 3,652,475 describes compositions containing a diorganopolysiloxane resin which is devoid of vinyl radicals, a diorganopolysiloxane resin containing from 5 to 20 mol % of vinylorganosiloxy units, a diorganopolysiloxane polymer having a degree of polymerization of 10 to 1,000, containing from 5 to 90 mol % of vinylorganosiloxy units, a reinforcing silica and an organic peroxide. The silicone elastomers obtained therefrom have improved tear resistance.

U.S. Pat. No. 3,660,345 relates to compositions containing a vinyl diorganopolysiloxane resin containing 0.01 to 0.6 mol % of vinylorganosiloxy units, a vinylmethylpolysiloxane polymer added in sufficient amount to provide vinylmethylsiloxy units representing 1 to 3.5% by weight of the mixture of resin and polymer, a reinforcing silica, and an organosilicon compound which prevents structuring. The vinylmethylpolysiloxane polymer can have from 2 to 100 mol %, preferably 5 to 20 mol % of methylvinylsiloxy units. The elastomers produced from such compositions have a high resilience, as well as improved tear resistance.

U.S. Pat. No. 4,335,035 describes compositions containing a diorganopolysiloxane resin containing 0.01 to 0.3% of vinyl radicals, an organohydropolysiloxane containing 0.2 to 2.5% of vinyl radicals, a reinforcing silica and an organic peroxide. The elastomers produced from such compositions have good heat characteristics and high tear resistance.

U.S. Pat. No. 4,444,940 relates to compositions containing:

(1) a diorganopolysiloxane having a viscosity of at least 10,000 mPa.s at 25° C., containing no vinyl radicals along the polymer chain; and (2) a diorganopolysiloxane having a degree of polymerization of 2 to 400, with each end of the polymer chain blocked by a diorganovinylsiloxy unit, also devoid of vinyl radicals along the polymer chain, a reinforcing or nonreinforcing filler, and an organic peroxide [the proportion of the polymer (2) is adjusted such as to provide 0.2 to 2 diorganovinylsiloxy units per 100 diorganosiloxy units constituting said diorganopolysiloxane (1)].

The aforesaid patents, and others, emphasize improvement in the physical or heat characteristics of the product silicone elastomers. However, they neither teach nor suggest any specific means for producing elastomers which offer a combination of qualities and characteristics which can be considered desiderata in this art.

In particular, such desiderata include:

(i) easy and rapid use in molding and extrusion apparatus;

(ii) the production of extrudates which have a smooth and homogeneous surface; and (iii) physical and electrical characteristics of a high order, whatever the selected hardness of the elastomers.

SUMMARY OF THE INVENTION

Accordingly, a major object of the present invention is the provision of improved organopolysiloxane compositions which set under the influence of heat into elastomers which display those properties, qualities, and characteristics heretofore considered desiderata in this art.

Briefly, the present invention features organopolysiloxane compositions which set under the influence of a peroxide catalyst and which comprise effective amounts of, on the one hand, diorganopolysiloxane oils containing a suitable proportion of vinylorganosiloxy recurring units and, on the other hand, certain amino compounds.

In the description which follows, all percentages and parts are given by weight, unless otherwise indicated.

DETAILED DESCRIPTION OF THE PREFERRED EMBODIMENTS OF THE INVENTION

More particularly according to the present invention, the subject organopolysiloxane compositions, which set under hot conditions to form elastomers, are advantageously comprised of:

(A) 100 parts of a mixture of organopolysiloxane polymers, containing:

(i) 70 to 98% by weight of a diorganopolysiloxane resin of the general formula:

$$R_{3-a}(R'O)_a SiO(R_2SiO)_n Si(OR')_a R_{3-a}$$

in which the symbols R, which are identical or different, are $C_1$–$C_8$ hydrocarbon radicals, substituted or unsubstituted by halogen atoms or cyano radicals; the symbol R' is a hydrogen atom or a $C_1$–$C_4$ alkyl radical; the symbol a is zero or one; the symbol n is a number whose value is sufficient to provide a viscosity of at least 1 million mPa.s at 25° C., at least 50% of the number of the radicals R are methyl radicals and 0.005 to 0.5 mol % of the recurring units constituting the resin composition are those of the formulae:

$$(CH_2=CH)(R)SiO$$

and $$(CH_2=CH)R_{2-a}(R'O)_a SiO_{0.5};$$

and (ii) 2 to 30% by weight of at least one diorganopolysiloxane oil having the formula $$R_3SiO(R_2SiO)_k SiR_3$$

in which the symbols R, which are identical or different, are defined as in (i); the symbol k is a number whose value is sufficient to provide a viscosity of 20,000 to 200,000 mPa.s at 25° C.; at least 50% of the number of radicals R are methyl radicals and 0.05 to 3 mol % of the recurring units constituting such oil are those of the formulae:

$$(CH_2=CH)RSiO$$

and $$(CH_2=CH)R_2SiO_{0.5};$$

(B) 0.01 to 10 parts of at least one amino compound having a pKa higher than 7.5 in an aqueous solution at 25° C. and a boiling point lower than 270° C. at atmospheric pressure;

(C) 5 to 280 parts of an inorganic filler; and (D) 0.1 to 7 parts of an organic peroxide.

The diorganopolysiloxane resin (i) having a viscosity of at least 1 million mPa.s at 25° C., preferably at least 2 million mPa.s at 25° C., comprises $R_2SiO$ recurring units along its polymer chain, and each end of its polymer chain is blocked by a $R_{3-a}(R'O)_a SiO_{0.5}$ unit; however, the presence of units of a different structure mixed with these units, for example, of the formulae $RSiO_{1.5}$ and $SiO_2$, is not excluded, in the proportion of at most 2% relative to the total number of the $R_2SiO$ and $R_{3-a}(R'O)_a SiO_{0.5}$ recurring units.

The symbol R signifies a $C_1$–$C_8$ hydrocarbon radical, either unsubstituted or substituted by halogen atoms or cyano radicals. Exemplary of such radicals, representative are:

(a) $C_1$–$C_5$ alkyl radicals, either unsubstituted or substituted by halogen atoms or cyano radicals, such as methyl, ethyl, propyl, isopropyl, butyl, isobutyl, pentyl, 3,3,3-trifluoropropyl, $\beta$-cyanoethyl or $\alpha$-cyanopropyl radicals;

(b) $C_2$–$C_4$ alkenyl radicals, such as vinyl, allyl or 2-butenyl radicals; and (c) $C_6$–$C_8$ mononuclear aryl radicals, either unsubstituted or substituted by halogen atoms, such as phenyl, chlorophenyl, tolyl or trifluoromethylphenyl radicals.

The $C_1$–$C_4$ alkyl radicals represented by the symbol R' are advantageously methyl, ethyl, propyl, isopropyl, butyl and secondary butyl radicals.

At least 60%, preferably at least 70% of the number of radicals denoted by R are methyl radicals.

Furthermore, vinyl radicals are also present in suitable amounts in the resin (i); these comprise recurring units of the formulae $CH_2=CH(R)SiO$ and $CH_2=CH(R_{2-a})(R'O)_a SiO_{0.5}$, the number of which represents 0.005 to 0.5 mol %, preferably 0.01 to 0.45 mol %, of all recurring units of the general formulae $R_2SiO$ and $R_{3-a}(R'O)_a SiO_{0.5}$ constituting the composition of resin (i).

As specific examples of recurring units which constitute the resins (i), those of the following formulae are representative:

$$(CH_3)_2SiO,$$

$$CH_3(CH_2=CH)SiO,$$

$$CH_3(C_6H_5)SiO,$$

$$(C_6H_5)_2SiO,$$

$$CH_3(C_2H_5)SiO,$$

$$CH_3CH_2-CH_2(CH_3)SiO,$$

$$CH_3(n\text{-}C_3H_7)SiO,$$

$$(CH_3)_3SiO_{0.5},$$

$$(CH_3)_2(CH_2=CH)SiO_{0.5},$$

$$CH_3(C_6H_5)_2SiO_{0.5},$$

$$CH_3(C_6H_5)(CH_2=CH)SiO_{0.5},$$

$$HO(CH_3)_2SiO_{0.5},$$

$$CH_3O(CH_3)_2SiO_{0.5},$$

$$C_2H_5O(CH_3)_2SiO_{0.5},$$

$$n\text{-}C_3H_7O(CH_3)_2SiO_{0.5},$$

$$HO(CH_2=CH)(CH_3)SiO_{0.5}.$$

The resins (i) are commercially available from the silicone manufacturers, and, furthermore, are readily produced using methods which are widely described in the chemical literature.

Typically, methylvinyldimethylpolysiloxane resins are used which contain $(CH_3)_2SiO$ and $CH_2=CH(CH_3)SiO$ recurring units along their polymer chains, and the polymer chain ends of which are terminated by units selected from among those of the formulae:

$(CH_3)_2CH_2=CHSiO_{0.5}$, $HO(CH_3)(CH_2=CH)SiO_{0.5}$, $(CH_3)_3SiO_{0.5}$, $C_6H_5(CH_3)CH_2=CHSiO_{0.5}$, $HO(CH_3)_2SiO_{0.5}$ or dimethylpolysiloxane resins blocked at each end of the polymer chain by one of the above units containing a vinyl radical.

Their viscosity is generally at least 2 million mPa.s at 25° C.

The diorganopolysiloxane oil (ii) has a structure which is closely related to that of the diorganopolysiloxane resin (i); it is advantageously a linear polymer having a viscosity of 20,000 to 200,000 mPa.s at 25° C., preferably 30,000 to 170,000 mPa.s at 25° C., comprising $R_2SiO$ recurring units along its polymer chain and blocked by an $R_3SiO_{0.5}$ unit at each end of its polymer chain.

Other units, for example, those of the formulae $RSiO_{1.5}$ and $SiO_2$, can be mixed with the above units, but they represent a small number which does not exceed 2% of all of the units of the formulae $R_2SiO$ and $R_3SiO_{0.5}$.

The symbol R has the same meaning as that given above in the description of the resin (i). Thus, it is a $C_1$–$C_8$ hydrocarbon radical, either unsubstituted or substituted by halogen atoms or cyano radicals, including, in particular, methyl and vinyl radicals. Suitable amounts of both of these types of radicals are necessarily present in the oil (ii). More particularly, at least 50%, preferably at least 60%, of the number of the radicals R are methyl radicals. As regards the vinyl radicals, the amount which is introduced is sufficient to provide units of the formulae $(CH_2=CH)(R)SiO$ and $(CH_2=CH)R_2SiO_{0.5}$, the number of which represents 0.05 to 3 mol %, preferably 0.07 to 2.8 mol % of all of the units of the general formulae $R_2SiO$ and $R_3SiO_{0.5}$ constituting the composition of the oil (ii).

As specific examples of recurring units constituting the oils (ii), the units corresponding to the following formulae are representative:

$(CH_3)_2SiO$, $CH_3(CH_2=CH)SiO$, $CH_3(n\text{-}C_3H_7)SiO$, $CH_3(C_6H_5)SiO$, $(C_6H_5)_2SiO$, $CH_3(C_2H_5)SiO$, $CF_3CH_2CH_2(CH_3)SiO$, $(CH_3)_3SiO_{0.5}$, $(CH_3)_2C_6H_5SiO_{0.5}$, $(CH_3)_2(CH_2=CH)SiO_{0.5}$, $CH_3(C_6H_5)(CH_2=CH)SiO_{0.5}$.

The oils (ii) are also commercially available from the silicone manufacturers; moreover, these too can be produced by known methods. Preferably, methylvinyldimethylpolysiloxane oils are used containing $(CH_3)_2SiO$ and $(CH_2=CH)(CH_3)SiO$ recurring units along their polymer chains and, at the ends of the polymer chains, terminating units selected from among those of the formulae:

$(CH_3)_3SiO_{0.5}$, $(CH_2=CH)(CH_3)_2SiO_{0.5}$, $CH_3(C_6H_5)(CH_2=CH)SiO_{0.5}$ or dimethylpolysiloxane oils blocked at each end of their polymer chains by one of the above units containing a vinyl radical; these oils have a viscosity of 30,000 to 170,000 mPa.s at 25° C.

The mixture of the resin (i) and the oil (ii) contains, by weight, 70 to 98%, preferably 75 to 95%, of the diorganopolysiloxane resin (i), and 30 to 2%, preferably 25 to 5%, of the oil (ii).

The amino compounds are present in the proportion of 0.01 to 10 parts, preferably 0.05 to 9 parts, per 100 parts of the mixture of the resin (i) and the oil (ii).

These compounds have, on the one hand, a pKa higher than 7.5, preferably higher than 8, in an aqueous solution at 25° C. and, on the other hand, a boiling point lower than 270° C., preferably lower than 240° C., at atmospheric pressure.

Among such amino compounds, preferred are ammonia ($NH_3$) and the primary, secondary or tertiary amines of the general formula:

$R''_b NH_{3-b}$ in which the symbols $R''$, which are identical or different, are $C_1$–$C_{10}$ alkyl radicals and the symbol b is 1, 2 or 3, with the combination of the alkyl radicals bonded to the nitrogen atom containing at most 14 carbon atoms, preferably at most 12 carbon atoms.

The $C_1$–$C_{10}$ alkyl radicals denoted by the symbol $R''$ are advantageously methyl, ethyl, propyl, isopropyl, butyl, isobutyl, secondary butyl, pentyl, isopentyl, hexyl, 2-ethylhexyl, heptyl, octyl, nonyl and decyl radicals.

The following compounds are specific examples of amines corresponding to the formula $R''_b N$:
b=1:
methylamine, ethylamine, n-propylamine,
isopropylamine, n-butylamine, isobutylamine,
n-pentylamine, n-hexylamine, n-heptylamine,
n-octylamine, n decylamine;
b=2:
dimethylamine, diethylamine, di(n-propyl)amine,
diisopropylamine, di(n-butyl)amine,
diisobutylamine, di(n-pentyl)amine,
di(n-hexyl)amine, di(n-heptyl)amine,
methyl(n-octyl)amine;
b=3:
trimethylamine, triethylamine, tri(n-propyl)amine, dimethylethylamine, tri(n-butyl)amine.

The inorganic fillers are incorporated in a proportion of 5 to 280 parts, preferably 7 to 250 parts, per 100 parts of the mixture of the resin (i) and of the oil (ii), These usually contain finely divided reinforcing fillers and nonreinforcing fillers of coarser sizes.

The reinforcing fillers are added in a proportion of 5 to 100 parts, preferably 7 to 90 parts per 100 parts of the mixture of the resin (i) and of the oil (ii).

These are preferably selected from among pyrogenic and precipitated silicas. Such silicas have a specific surface, measured according to the BET and CTAB methods, of at least 50 m²/g, preferably greater than 70 m²/g, a mean primary particle size of less than 80 nanometers and an apparent density of less than 200 g/1 liter.

These silicas can be incorporated as such, or after they have been treated with the organosilicon compounds usually employed for this purpose. Such compounds include methylpolysiloxanes, such as hexamethyldisiloxane, octamethylcyclotetrasiloxane, methylpolysilazanes, such as hexamethyldisilazane, hexamethylcyclotrisilazane, chlorosilanes, such as dimethyldichlorosilane, trimethylchlorosilane, methylvinyldichlorosilane, dimethylvinylchlorosilane, alkoxysilanes, such as dimethyldimethoxysilane, dimethylvinylethoxysilane, and trimethylmethoxysilane. During this treatment the initial weight of the silicas can increase up to an amount of 20%, preferably approximately 18%.

The nonreinforcing fillers include inorganic fillers whose mean particle diameter is greater than 0.1 micrometer.

These fillers are especially represented by ground quartz, calcined clays, diatomaceous silicas, calcium carbonate, and iron, titanium, magnesium and aluminum oxides. They are added in a proportion not exceeding 180 parts, preferably not exceeding 160 parts, per 100 parts of the mixtures of the resin (i) and of the oil (ii). These inorganic fillers can be used as such, that is to say, untreated, or treated with the organosilicon compounds referred to above in the case of the reinforcing silicas.

The organic peroxides are incorporated in a proportion of 0.1 to 7 parts, preferably 0.2 to 6 parts, per 100 parts of the mixture of the resin (i) and of the oil (ii). They are well known to those skilled in the art of manufacture of rubbers and include, especially, benzoyl peroxide, 2,4-dichlorobenzoyl peroxide, dicumyl peroxide, 2,5-bis-(t-butylperoxy)-2,5-dimethylhexane, t-butyl perbenzoate, t-butylperoxy isopropyl carbonate, di-t-butyl peroxide, and 1,1-bis(t-butylperoxy)-3,3,5-trimethylcyclohexane.

These various peroxides decompose at temperatures and rates which are sometimes different. They are selected as a function of the required setting conditions.

Besides the principal components referred to above, other components can be added to the compositions according to the invention. They comprise, in particular:

(E) diorganopolysiloxane oils of the formula:

$$(R'O)R'''_2SiO(R''_2SiO)_rSiR'''_2(OR')$$

in which the symbols $R'''$, which are identical or different, are methyl, phenyl, or vinyl radicals; the symbol $R'$ [which has the same meaning as the symbol $R'$ constituting the formula of the resin (i)] is a hydrogen atom or a $C_1$–$C_4$ alkyl radical; the symbol r is a number whose value is such as to produce a viscosity not exceeding 5,000 mPa.s at 25° C.; furthermore, at least 40%, preferably at least 45% of the radicals $R'''$ are methyl radicals.

These oils can be added in a proportion of 0.1 to 15 parts, preferably 0.3 to 12 parts, per 100 parts of the mixture of the resin (i) and of the vinyl oil (ii). Their viscosity is preferably less than 4,000 mPa.s at 25° C.

The following units are specific examples of units of the formulae $R'''_2SiO$ and $R'''_2(R'O)SiO_{0.5}$ constituting such oil:

$(CH_3)_2SiO$, $CH_3(CH_2=CH)SiO$, $CH_3(C_6H_5)SiO$, $(C_6H_5)_2SiO$, $C_6H_5(CH_2=CH)SiO$, $HO(CH_3)_2SiO_{0.5}$, $CH_3O(CH_3)_2SiO_{0.5}$, $HO(CH_3)(CH_2=CH)SiO_{0.5}$, $C_2H_5O(CH_3)_2SiO_{0.5}$.

Preferably used are:
(a) dimethylpolysiloxane oils of the formula:

$$R^1O(CH_3)_2SiO[(CH_3)_2SiO)]_{r^1}Si(CH_3)_2OB^1$$

in which $R^1$ is a hydrogen atom, a methyl radical, a β-methoxyethyl radical, an ethyl radical, and $r^1$ is a suitable number to provide a viscosity of 10 to 200 mPa.s a 25° C.;

(b) methylphenylpolysiloxane oils of the formula:

$$R^2O(CH_3)(C_6H_5)SiO[(C_6H_5)(CH_3)SiO]_{r^2}Si(C_6H_5)(CH_3)OR^2$$

in which $R^2$ is a hydrogen atom or a methyl radical, and $r^2$ is a suitable number to provide a viscosity of 40 to 2,000 mPa.s at 25° C.

The purpose of using the oils is to prevent the compositions of the invention from undergoing a change during storage, and more precisely of structuring and setting; these are, therefore, "antistructuring" agents. Their use is especially advantageous when the quantities of reinforcing fillers are high, for example, more than 20–40 parts per 100 parts of the mixture of the resin (i) and of the oil (ii);

(2E) organosilicon compounds corresponding to the general formula:

$$(F_1)\ CH_2=C(R^3)COO(CH_2)_wSi(R''')_u(OR^4)_{3-u}$$

in which the symbol $R'''$ [which has the same definition as the symbol $R'''$ in the formula of the oil (E) described above] is a methyl, vinyl or phenyl radical; the symbol $R^3$ is a hydrogen atom or a methyl radical; the symbol $R^4$ is a methyl, ethyl, n-propyl, β-methoxyethyl radical or radicals of the formulae:

$$-CH(CH_3)CH_2OCH_3 \text{ or } -CH_2-CH(CH_3)OCH_3$$

in which the symbol w is a number from 1 to 5 and the symbol u is a number from 0 to 2.

These include, consequently, the methacryloyloxyalkylalkoxysilanes and the acryloyloxyalkylalkoxysilanes which appear, for example, in U.S. Pat. No. 3,567,497.

As specific examples of such silanes, representative are those of the formulae:

$CH_2=CH-COOCH_2Si(OCH_3)_3$ $CH_2=CH-COOCH_2Si(OCH_2OCH_3)_2C_6H_5$ $CH_2=CH-COO(CH_2)_3Si(OCH_2H_5)_3$ $CH_2=C(CH_3)COO(CH_2)_3Si(OCH_3)_3$ $CH_2=C(CH_3)COO(CH_2)_3SiCH_3(OCH_3)_2$ $CH_2=C(CH_3)COO(CH_2)_5Si(OCH_3)_3$ $CH_2=C(CH_3)COO(CH_2)_3Si(OCH_3)_2[OCH(CH_3)CH_2OCH_3]$

They can be added to the compositions of the invention in a proportion of 0.01 to 4 parts, preferably of 0.02 to 3 parts, per 100 parts of the mixture of resin (i) and of the oil (ii).

In lieu of the silanes, it is possible to use, in the same proportions, products of their partial hydrolysis, which correspond to the average general formula:

$$CH_2=C(R^3)COO(CH_2)_wSi(OR^4)_tO_{\frac{3-(t+u)}{2}}(R''')_u$$

in which the symbols $R'''$, $R^3$, $R^4$, $w$ and $u$ are as defined above and the symbol $t$ is any number from 0.5 to 2.2, with the sum $t+u$ ranging from 0.8 to 2.5.

It is advantageous that the hydrolysis of the silanes be carried out at temperatures in the range of 30° to 100° C., in the presence of an acid catalyst, such as hydrochloric acid, phosphoric acid, or acetic acid, with a molar quantity of water which is less than the quantity required to hydrolyze all of the $SiOR^4$ bonds (in theory, 1 mole of water makes it possible to convert two $SiOR^4$ bonds into one siloxane bond Si—O—Si). The hydrolysis can take place in a hydrocarbon or halohydrocarbon solvent, or in the absence thereof.

Besides the silanes and the products of their partial hydrolysis, it is also possible to use (in the same proportions as the silanes) products of the reaction of the silanes of formula (F$^1$) with the above diorganopolysiloxane oils (E). The silanes are limited to those of the formula (F$^2$), $$CH=C(R^3)COO(CH_2)_wSi(OR^4)_3,$$

which formula derives from (F$^1$) when $u=$ zero, and the oils (E) are limited to those blocked by a hydroxyl radical at each end of their polymer chain, having a viscosity of 70 to 500 mPa.s at 25° C., and containing at least 60% of methyl radicals and not more than 3% of vinyl radicals.

The oils (E) and the silanes (F$^2$) are mixed in proportions such that the molar ratio $SiOH/SiOR^4$ ranges from 0.1 to 0.95. The reaction is catalyzed with a compound selected from among the alkyl titanates and polytitanates and diorganotin salts of aliphatic carboxylic acids; the catalyst is used in an amount of 0.05 to 2 parts per 100 parts of the mixture of the oils (E) and the silanes (F$^2$). The alcohol of the formula $R^4OH$ which is formed during the reaction, can be removed or not removed from the reaction mixtures. If it is removed, then 45% of the theoretical amount by weight, based on the number of the SiOH and $SiOR^4$ radicals present in the mixtures, should not be exceeded. Such a process is described in French Patent No. 2,447,386; it provides stable organopolysiloxane polymers, having a viscosity of 60 mPa.s to 20,000 mPa.s at 25° C.;

(3E) organic or inorganic derivatives of an alkaline earth metal selected from among calcium, barium, strontium, or magnesium. These derivatives can be added in a proportion of 0.01 to 10 parts, preferably from 0.02 to 8 parts, per 100 parts of the mixture of the resin (i) and of the oil (ii). They improve the surface appearance of the elastomers, especially when they are not postcured, and their oil resistance.

As specific examples of such derivatives, representative are calcium silicate and polysilicate, magnesium, calcium and barium oxides and hydroxides, and calcium salts of $C_1$-$C_{20}$ carboxylic acids, such as calcium octoate, calcium 2-ethylhexanoate, calcium stearate, calcium linoleate and calcium naphthenate.

Other adjuvants can also be included, for example:

(a) inorganic and organic pigments, such as rutile-type titanium dioxide, cobalt blue, various iron oxides, nickel/chromium titanates, aluminum powder and copper phthalocyanines;

(b) heat stabilizers, such as iron, cerium and manganese salts of $C_1$-$C_{10}$ carboxylic acids (octoate, ethylhexanoate, naphthenate), rare earth (lanthanum, cerium, praseodymium, neodymium, etc.) oxides and hydroxides, and the minerals comprised thereof, such as monazite;

(b) fire-retardant agents, based chiefly on platinum derivatives. These derivatives are generally selected from among chloroplatinic acid, $H_2PtCl_6.6H_2O$, platinic chloride, $PtCl_4$, and platinous chloride, $PtCl_2$, and complexes thereof or their reaction products with organic or organosilicon compounds. They are preferably combined with cerium oxides and hydroxides, or with titanium, iron or aluminum oxides produced by combustion. Such combinations appear, inter alia, in French Patents Nos. 2,051,792, 2,166,313 and 2,203,846.

Compositions according to the invention are prepared by known mechanical means, for example, kneaders, roll mills or screw mixers. The various constituents can be introduced into these devices in any order. However, it is advantageous to first charge the resins (i), the vinyl oils (ii), the inorganic fillers, the amino compounds and, lastly, the organic peroxides.

The compositions obtained are stable when stored; furthermore, they are easily molded and extruded, permitting excellent filling of multicavity molds and the production of extrudates devoid of surface faults.

They can be set to form elastomers by heating under pressure or in open air to temperatures on the order of 100° to 350° C. Obviously, the heating time varies with the temperature, pressure and the nature of the peroxides; it is typically several minutes at about 100°-200° C. and a few seconds at about 250°-350° C.

The elastomers formed in this manner can be heated subsequently, especially those obtained by molding, in the range of 200°-280° C., for a period of at least one hour, the purpose being to complete their crosslinking and to remove the volatile substances contained therein.

Nevertheless, as soon as the first phase of their crosslinking is complete, that is to say, prior to an eventual postcure phase, these elastomers possess good physical characteristics and, more precisely, good rupture strength and tear resistance, whatever the amount of inorganic fillers contained therein; thus, this amount can be 20 to 40 parts of reinforcing silicas per 100 parts of the mixture of the resin (i) and the vinyl oil (ii), or of the same amount of reinforcing silicas to which 100 to 180 parts of nonreinforcing fillers, such as a diatomaceous silica or ground quartz, are added.

Furthermore, they have good resistance to boiling water. To measure this property, specimens of elastomers are immersed in boiling water for a period of several tens of hours; the physical characteristics are then examined, and they are not greatly affected by the treatment, and, in particular, the changes in volume and weight are low, generally less than 1%.

In addition, these elastomers have excellent electrical properties, principally where volume resistivity and dielectric strength are concerned; as a result of this, they are especially adopted for electrical insulation.

Also, when fabricated by extrusion, they have remarkable surface appearance and a homogeneous internal structure. Their surface is smooth, free from blistering and pitting and their internal structure is homogeneous and free from microbubbles. These faults or defects are usually produced when precipitated silicas are used as reinforcing fillers, instead of pyrogenic silicas.

The compositions according to the invention can be used for the manufacture, using molding, calendering or extrusion, of numerous components made of silicone elastomers or of articles coated with such elastomers.

These compounds can be seals, sections, tubes, protective articles of various shapes, intended, for example, for use in mechanical engineering (sealing rings), vehicle construction (headlamp jackets, spark plug covers), building (door frame seals), and electrical appliances (oven or refrigerator door seals).

The elastomer-coated articles are notably electrical cables enveloped within an elastomer jacket, and composites comprising glass cloths (or other flat materials) and sheets of elastomer.

The components can also be used in the medical, pharmaceutical or foodstuff fields, by virtue of the perfectly harmless and nontoxic nature of silicone elastomers; in these applications, they are preferably translucent or even transparent. For example, they can be in the shape of tubes (for blood transfusion or dialysis apparatus), teats, plugs, or thermally insulating plates.

In order to further illustrate the present invention and the advantages thereof, the following specific examples are given, it being understood that same are intended only as illustrative and in nowise limitative.

EXAMPLE 1

The following constituents were intimately admixed using a kneader:

(a) 85 parts of a dimethylpolysiloxane resin $G^1$, blocked by a dimethylvinylsiloxy unit at each end of its polymer chain, and containing 0.012% of vinyl radicals, i.e., approximately 0.027 mol % of dimethylvinylsiloxy units;

(b) 15 parts of a methylvinyldimethylpolysiloxane oil $H^1$, blocked by a dimethylvinylsiloxy unit at each end of its polymer chain, having a viscosity of 76,000 mPa.s at 25° C., containing 0.072% of vinyl radicals originating from the methylvinylsiloxy units and 0.072% of vinyl radicals originating from the dimethylvinylsiloxy units (i.e., approximately 0.16 mol % of methylvinylsiloxy units and 0.16 mol % of dimethylvinylsiloxy units, relative to all of the units forming the oil $H^1$);

(c) 2.5 parts of a dimethylpolysiloxane oil blocked at each end of its polymer chain by a hydroxyl radical bonded to the terminal silicon atom, having a viscosity of 50 mPa.s at 25° C., and containing approximately 8% of hydroxyl radicals;

(d) 1.5 parts of a methylphenylpolysiloxane oil blocked at each end of its polymer chain by a methoxy radical bonded to the terminal silicon atom, having a viscosity of 250 mPa.s at 25° C., and containing approximately 6% of methoxy radicals;

(e) 0.1 part of the silane of the formula $$CH_2=C(CH_3)COO(CH_2)_3Si(OCH_3)_3;$$

(f) 5 parts of a pyrogenic silica having a specific surface of 200 m²/g;

(g) 25 parts of a precipitated silica having a specific surface of 160 m²/g;

(h) 1 part of diethylamine; and (i) 0.5 part of $Ca(OH)_2$.

The entire mass was kneaded for 1 hour at a temperature of 120° C. and resulted in the formation of a first homogeneous composition $C^1$.

A second composition $C^2$ was produced using the above operating procedure; however, the following change was made:

15 parts of vinyl oil $H^1$ were replaced by 15 parts of a methylvinyldimethylpolysiloxane oil blocked by a trimethylsiloxy unit at each end of its polymer chain, having a viscosity of 81,000 mPa.s at 25° C., and containing 0.16 mol % of methylvinylsiloxy units.

Compositions *$C^3$, *$C^4$ and *$C^5$ were then produced by way of comparison, also by reproducing the operating procedure used to prepare the composition $C^1$, but the following changes were incorporated:

Composition *$C^3$: 15 parts of vinyl oil $H_1$ were replaced by 15 parts of a methylvinyldimethylpolysiloxane oil blocked by a dimethylvinylsiloxy unit at each end of its polymer chain, having a viscosity of 15,000 mPa.s at 25° C., and containing 0.5 mol % of methylvinylsiloxy units and 0.32 mol % of dimethylvinylsiloxy units.

Composition *$C^4$: 15 parts of vinyl oil $H^1$ were replaced by 15 parts of a methylvinyldimethylpolysiloxane oil, blocked by a trimethylsiloxy unit at each end of its polymer chain, having a viscosity of 12,000 mPa.s at 25° C., and containing 0.5 mol % of methylvinylsiloxy units.

Composition *$C^4$: 85 parts of resin $G^1$ were reduced to 70 parts, 15 parts of oil $H^1$ were replaced by 30 parts of a methylvinyldimethylpolysiloxane resin blocked by a trimethylsiloxy unit at each end of its polymer chain and containing 0.072% of vinyl radicals, i.e., approximately 0.20 mol % of methylvinylsiloxy units.

The compositions were catalyzed using 2,5-dimethyl-2,5-di(tert-butylperoxy)hexane; the amount of peroxide constituted 0.5% of the weight of each composition.

The compositions were set to form elastomers by compression molding for 10 minutes at 170° C. The elastomers were divided into two batches and one of the two batches was postcured by heating at 200° C. for 4 hours.

The mechanical properties of the elastomers which had, or had not been postcured, were then measured.

The results are reported in the following Table I:

TABLE I

| PROPERTIES | ELASTOMERS | | | | |
|---|---|---|---|---|---|
|  | $C^1$ | $C^2$ | *$C^3$ | *$C^4$ | *$C^5$ |
| NOT POSTCURED |  |  |  |  |  |
| Shore A hardness | 36 | 31 | 43 | 35 | 39 |
| Rupture strength in MPa | 9 | 9.5 | 7.1 | 8 | 7.5 |
| Elongation at break in % | 770 | 920 | 530 | 710 | 540 |
| Tear resistance in kN/m | 23 | 27 | 14 | 20 | 12 |
| POSTCURED 4 HOURS AT 200° C. |  |  |  |  |  |

TABLE I-continued

| PROPERTIES | ELASTOMERS | | | | |
|---|---|---|---|---|---|
| | $C^1$ | $C^2$ | *$C^3$ | *$C^4$ | *$C^5$ |
| Shore A hardness | 35 | 31 | 42 | 36 | 40 |
| Rupture strength in MPa | 9.6 | 9.2 | 7.1 | 8.1 | 7.5 |
| Elongation at break in % | 810 | 910 | 590 | 750 | 540 |
| Tear resistance in kN/m | 22 | 25 | 13 | 19 | 14 |

It was found that the elastomers produced using compositions $C^1$ and $C^2$ had better tensile properties (rupture strength, elongation at break) than the elastomers produced using the comparative compositions *$C^3$, *$C^4$ and *$C^5$; furthermore, their tear resistance was also high and was clearly superior, in particular, to that exhibited by the elastomer produced using the composition *$C^5$, which did not contain the vinyl oil $H^1$.

EXAMPLE 2

Two compositions $C^6$ and $C^7$ were produced following the operating procedure used to produce the composition $C^1$ in Example 1.

The constituents were the same as those described in Example 1, but the following changes were made:

Composition $C^6$: 90 parts of the dimethylpolysiloxane resins $G^1$ were used instead of 85 parts, and 10 parts of the methylvinyldimethylpolysiloxane oil $H^1$ were used instead of 15 parts.

Composition $C^7$: 93 parts of the dimethylpolysiloxane resin $G^1$ were used instead of 85 parts, and 7 parts of the methylvinyldimethylpolysiloxane oil $H^1$ were used instead of 15 parts.

100 parts of ground quartz having a specific surface on the order of 2 m²/g were added to 100 parts of each composition $C^1$, $C^6$ and $C^7$. Furthermore, by way of comparison, 100 parts of ground quartz were also added:

(1) to 100 parts of the composition *$C^5$ described in Example 1 (the combination comprising 85 parts of the resin $G^1$ and 15 parts of the vinyl oil $H^1$ of the composition $C^1$ had been replaced by the combination comprising 70 parts of the resin $G^1$ and 30 parts of a vinyl resin containing 0.20 mol % of methylvinylsiloxy units);

(2) to 100 parts of a composition *$C^8$, identical to composition $C^1$ except that it contained no diethylamine (omission of 1 part of this amine).

In this manner, filled compositions $C^1$, $C^6$, $C^7$, *$C^5$ and *$C^8$ were obtained, and were catalyzed by the addition of 2,5-dimethyl-2,5-di(tert-butylperoxy)hexane.

The amount of peroxide constituted 0.25% of the weight of each filled composition.

The filled compositions were set to form elastomers by compression molding for 10 minutes at 170° C.

The elastomers were divided into two batches and one of the two batches was postcured by heating at 200° C. for 4 hours.

The mechanical properties of the elastomers which had, or had not been postcured, were then measured.

The results are reported in the following Table II:

TABLE II

| PROPERTIES | ELASTOMERS | | | | |
|---|---|---|---|---|---|
| | Filled composition $C^1$ | Filled composition $C^6$ | Filled composition $C^7$ | Filled composition *$C^5$ | Filled composition *$C^8$ |
| NOT POSTCURED | | | | | |
| Shore A hardness | 69 | 68 | 70 | 67 | 68 |
| Rupture strength in MPa | 8.3 | 7.5 | 7.4 | 5.7 | 4.5 |
| Elongation at break in % | 240 | 220 | 220 | 190 | 240 |
| POSTCURED 4 HOURS AT 200° C. | | | | | |
| Shore A hardness | 71 | 71 | 72 | 69 | 68 |
| Rupture strength in MPa | 8.2 | 7.9 | 7.8 | 6.8 | 6.1 |
| Elongation at break in % | 190 | 190 | 180 | 190 | 240 |

It was found, principally in the nonpostcured state, that the elastomers produced using the filled compositions $C^1$, $C^6$ and $C^7$ had a rupture strength which was markedly higher than that of the elastomers produced using filled compositions *$C^5$ and *$C^8$.

EXAMPLE 3

1. The compositions $C^1$ and *$C^5$, described in Example 1 (composition *$C^5$ was devoid of vinyl oil $H^1$) were catalyzed using a paste consisting of a dispersion of 2,4-dichlorobenzoyl peroxide at a concentration of 50% by weight in a silicone oil; the amount of paste employed constituted 1% of the weight of each composition.

The compositions were extruded in the form of sections having a 2 mm diameter by a 15-second passage through an oven heated at 300° C.

It was found that the vulcanizate produced using composition $C^1$ had, on the one hand, a smooth surface and, on the other hand, a homogeneous structure which was free from microbubbles; in contrast, the vulcanizate produced using composition *$C^5$ had a blistered surface, forming an "orange peel", and its inner volume contained many microbubbles.

2. The composition *$C^8$, described in Example 2, (this was a composition which was identical to composition $C^1$, but contained no diethylamine) was catalyzed using 2,4-dichlorobenzoyl peroxide according to the process described under (1).

Compositions $C^1$ and *$C^8$ (both catalyzed using 2,4-dichlorobenzoyl peroxide) were then set to form elastomers by compression molding for 8 minutes at 115° C. The elastomers were divided into two batches.

The volume resistivity was measured for one of the batches. The results were:
Elastomer produced using $C^1$: $1.45 \times 10^{15}$ Ω·cm
Elastomer produced using *$C^8$: $1.55 \times 10^{14}$ Ω·cm It was found, therefore, that the elastomer produced using $C^1$ had a better volume resistivity than the elastomer produced using *$C^8$.

The other batch was first used to measure the physical characteristics of the elastomers; specimens of these elastomers were then immersed for 70 hours in boiling water at atmospheric pressure. Their physical characteristics were also measured after this treatment.

The changes in the values of these characteristics are reported in the following Table III:

TABLE III

| CHANGES IN % | ELASTOMERS | |
|---|---|---|
|  | produced from C¹ | produced from *C⁸ |
| in volume | 0.6 | 3 |
| in weight | 0.9 | 3.4 |
| in rupture strenght | 4 | −4 |
| in elongation at break | −4 | −15 |

It was found that the elastomer produced using composition $C^1$ exhibited better resistance to boiling water than that produced using composition $C^8$.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A heat-vulcanizable organopolysiloxane composition of matter, comprising:
   (A) 100 parts of a mixture of organopolysiloxane polymers containing:
      (i) 70 to 98% by weight of a diorganopolysiloxane resin of the general formula $$R_{3-a}(R'O)_a SiO)_n Si(OR')_a R_{3-a}$$

in which the symbols R, which are identical or different, are $C_1$–$C_8$ hydrocarbon radicals, or substituted such hydrocarbon radicals bearing at least one halogen atom or cyano radicals; the symbol R' is a hydrogen atom or a $C_1$–$C_4$ alkyl radical, the symbol a is zero or one, and the symbol n is a number whose value is sufficient to provide a viscosity of at least 1 million mPa.s at 25° C., with the proviso that at least 50% of the number of radicals R are methyl radicals and said resin also contains 0.005 to 0.5 mol % of the units comprising the resin composition, units of the formulae:

$$(CH_2=CH)(R)SiO$$

and $$(CH_2=CH)R_{2-a}(R'O)_a Si O_{0.5};$$

(ii) 2 to 30% by weight of at least one diorganopolysiloxane oil of the formula:

$$R_3 SiO(R_2 SiO)_k SiR_3$$

in which the symbols R, which are identical or different, are defined as in (i), and the symbol k is a number whose value is sufficient to provide a viscosity of 20,000 to 200,000 mPa.s at 25° C., with the proviso that at least 50% of the number of radicals R are methyl radicals and said oil also contains 0.05 to 3 mol % of the units comprising the oil units of the formulae:

$$(CH_2=CH)RSiO \text{ and } (CH_2=CH)R_2 SiO_{0.5};$$

(B) 0.01 to 10 parts of at least one amine or ammonia having a $pK_a$ higher than 7.5 in an aqueous solution at 25° C. and a boiling point lower than 270° C. at atmospheric pressure;
   (C) 5 to 280 parts of an inorganic filler; and
   (D) 0.1 to 7 parts of an organic peroxide.

2. The organopolysiloxane composition as defined by claim 1, said resin (i) comprising $(CH_3)_2 SiO$ and $CH_2=CH(CH_3)SiO$ recurring units along the polymer chain thereof, and, terminating units at the ends of the polymer chain, said terminating units selected from the group consisting of:

$$(CH_3)_2 CH_2=CHSiO_{0.5},$$

$$HO(CH_3)(CH_2=CH)SiO_{0.5},$$

$$(CH_3)SiO_{0.5},$$

$$C_6H_5(CH_3)CH_2=CHSiO_{0.5},$$

and $$HO(CH_3)_2 SiO_{0.5},$$

and having a viscosity of at least 2 million mPa.s at 25° C.

3. The organopolysiloxane composition as defined by claim 1 said diorganopolysiloxane oil having a viscosity of 30,000 to 170,000 mPa.S at 25° C. and comprising $(CH_3)_2 SiO$ and $CH_2=CH(CH_3)SiO$ recurring units along the polymer chain thereof, and, terminating units at the ends of the polymer chain, said terminating units selected from the groups consisting of:

$$(CH_3)SiO_{0.5},$$

$$(CH_2=CH)(CH_3)_2 SiO_{0.5},$$

and $$CH_3(CH_6H_5)(CH_2=CH)SiO_{0.5}.$$

4. The organopolysiloxane composition as defined by claim 1, said amine comprising a primary, secondary or tertiary amine of the general formula:

$$R''_b N H_{3-b}$$

in which the symbols R", which are identical or different, are $C_1$–$C_{10}$ alkyl radicals and the symbol b is 1, 2 or 3, with the number of alkyl radicals bonded to the nitrogen atom containing a total amount of at most 14 carbon atoms.

5. The organopolysiloxane composition as defined by claim 1, further comprising:
   (E) a diorganopolysiloxane oil of the formula:

$$(R'O)R'''_2 SiO(R'''_2 SiO)_r SiR'''_2(OR')$$

in which the symbols R''', which are identical or different, are methyl, phenyl or vinyl radicals; the symbol R' is a hydrogen atom or a $C_1$–$C_4$ alkyl radical; the symbol r is a number having a value such as to provide a viscosity not exceeding 5,000 mPa.s at 25° C.; at least 40% of the radicals R''' are methyl radicals;
   (2E) an organosilicon compound of the general formula:

$$(F_1) \; CH_2=C(R^3)COO(CH_2)_w Si(R''')_u(OR^4)_{3-u}$$

in which the symbol R''' is a methyl, vinyl or phenyl radical; the symbol $R^3$ is a hydrogen atom or a methyl radical; the symbol $R^4$ is a methyl, ethyl, n-propyl, β-methoxyethyl radical or a radical of the formulae:

—CH(CH₃)CH₂OCH₃ or —CH₂—CH(CH₃)OCH₃;

the symbol w is a number from 1 to 5 and the symbol u is a number from 0 to 2; and
(3E) at least one organic or inorganic compound of magnesium, calcium, barium or strontium.

6. The organopolysiloxane composition as defined by claim 5, comprising from 0.1 to 15 parts of said diorganopolysiloxone oil (E) per 100 parts of the mixture of said resin (i) and diorganopolysiloxane oil.

7. The organopolysiloxane composition as defined by claim 5, comprising from 0.001 to 10 parts of said compound (3E) per 100 parts of the mixture of said resin and diorganopolysiloxane oil.

8. The organopolysiloxane composition as defined by claim 1, in cured elastomeric state.

9. A shaped article comprising the organopolysiloxane elastomer as defined by claim 8.

* * * * *